United States Patent [19]
Nishioka

[11] Patent Number: 5,515,127
[45] Date of Patent: May 7, 1996

[54] STRUCTURE FOR FIXING ELECTRIC DRIVING DEVICE TO CAMERA BODY

[75] Inventor: Sunao Nishioka, Tokyo, Japan

[73] Assignee: Nikon Corporation, Tokyo, Japan

[21] Appl. No.: 350,190

[22] Filed: Nov. 30, 1994

[30] Foreign Application Priority Data

Dec. 22, 1993 [JP] Japan ................... 5-324830

[51] Int. Cl.⁶ ................................. G03B 17/02
[52] U.S. Cl. ........................... 354/212; 354/288
[58] Field of Search ................. 354/202, 212, 354/288

[56] References Cited

U.S. PATENT DOCUMENTS 4,967,216  10/1990  Nishio et al. ............. 354/212 X

FOREIGN PATENT DOCUMENTS 4-371932  12/1992  Japan .

Primary Examiner—Michael L. Gellner
Assistant Examiner—J. K. Han

[57] ABSTRACT

A camera comprising a camera body; a supporting base plate mounted to the camera body across a connecting member; a rotary shaft extending at an end into the camera body through the supporting base plate; a bearing member for rotatably supporting the rotary shaft on the supporting base plate; and an elastic member provided between the bearing member and the camera body, whereby the camera body supports the bearing member across the elastic member.

5 Claims, 4 Drawing Sheets

STRUCTURE FOR FIXING ELECTRIC DRIVING DEVICE TO CAMERA BODY

BACKGROUND OF THE INVENTION

1. Field of the Invention

The present invention relates to a camera, and more particularly to a structure for fixing an electric driving device for a camera to a camera body.

2. Related Background Art

For such structure there is already known, for example, one shown in FIG. 1, which is a cross-sectional view of a conventional structure for fixing an electric driving device for a camera to the camera body.

Referring to FIG. 1, an electric driving mechanism composed of a motor and gears is provided for film feeding, by transmitting the driving force of said motor and gears to a spool 1 thereby rotating said spool. A dust preventing member 30 is provided for preventing intrusion of dusts, such as broken pieces of the film, to a unit base plate 10, and also for preventing intrusion of oil etc. from said unit base plate 10.

Also a sprocket 2 is rotated by the meshing of the teeth 2a thereof with perforation holes of the film. The rotation is transmitted from a sprocket gear 3 to a sprocket conversion gear 4, and further to a sprocket limiting cam 5, a reversing prevention cam 6 and a phase detecting plate 7 rotating integrally with said sprocket conversion gear 4. The phase detection plate 7 is provided with a phase detecting switch 8 of which signal is used for controlling a motor 9 for film advancement.

The electric driving mechanism is integrally fixed on the unit base plate 10, which is fixed with a screw 13, either directly or through an elastic member 12 composed for example of rubber, to a camera body 11 formed by aluminum die casting or plastic molding.

However, such conventional structure has been associated with a drawback of noises and vibration from the motor and the gears becoming noticeable when the unit base plate 10 is directly screwed to the camera body 11. This drawback can be prevented by screwing the unit base plate 10 to the camera body 11 with a rubber member or the like therebetween, and, in the illustrated conventional example, the unit base plate 10 is screwed to the camera body 11 with an elastic member 12 provided therebetween.

On the other hand, the spool 1 is supported, as shown in FIG. 1, by the camera body 11 by way of a spool bearing 14, and, a certain gap has to be provided between the bearing 14 and the camera body 11, in consideration of the assembling procedure. Since no elastic member is provided in said gap, there inevitably results a positional aberration of the spool 1 relative to the camera body 11.

Consequently, even if the noises and the vibration can be alleviated by screwing the unit base plate 10 to the camera body 11 with the elastic member 12 therebetween, it has not been possible to secure the positional precision of the spool 1 relative to the camera body 11. Such drawback is not limited to the spool 1, but a similar drawback is associated with the sprocket 2.

This fact leads to another drawback which is explained in the following. The camera body is generally provided therein with an exposure aperture for exposing the film to the light, and it is not possible to maintain the positional precision of the spool 1 and the sprocket 2 relative to said exposure aperture, once a positional aberration is involved in the sprocket 2. As a result, the stopping position of the film can no longer be made constant, and the gap between the image frames on the film inevitably fluctuates.

SUMMARY OF THE INVENTION

In consideration of the foregoing, the object of the present invention is to provide a camera capable of preventing positional aberration of the spool or the sprocket, and suppressing the vibrations and noises therefrom.

The above-mentioned object can be attained, according to the present invention, by a structure in which the unit base plate 10 adapted to be fixed to the camera body 11 is provided with positioning members 20a, 22a, equipped with elastic ring members 21, 23.

According to the present invention, as the positioning is achieved by the elastic ring members supported by the positioning members provided on the unit base plate, there can be provided a driving mechanism for a camera, capable of improving the positional precision with reduced vibrations and noises.

DESCRIPTION OF THE PREFERRED EMBODIMENTS

Now the present invention will be clarified in detail by embodiments thereof shown in the attached drawings.

[First Embodiment]

Figure 2:
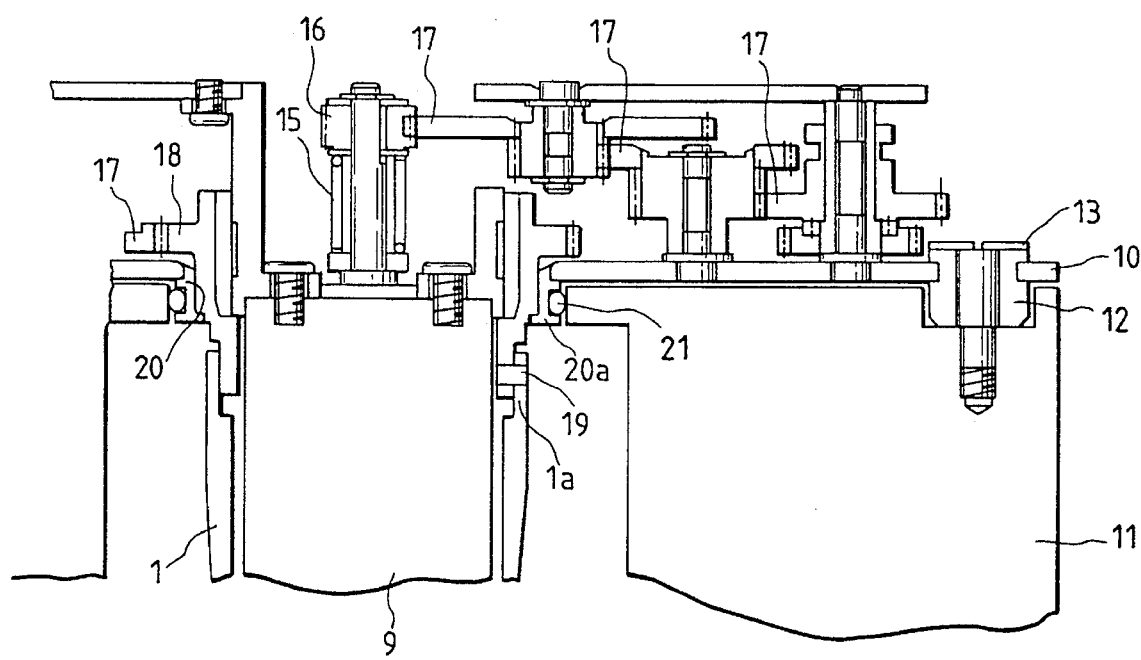
FIG. 2 is a cross-sectional view of a first embodiment of the camera of the present invention.

FIG. 2 is a cross-sectional view of a first embodiment of the present invention, wherein a unit base plate 10 is fixed, by a screw 13, to a camera body 11 with an elastic member 12 positioned therebetween. A motor pinion gear 16 is mounted, through a slip mechanism 15, on the shaft of a film advancing motor 9 mounted on the unit base plate 10. Said motor pinion gear 16 meshes with a gear train 17, which is turn meshes with a spool driving gear 18, and a connecting pin 19 provided thereon engages with a connecting notch 1a formed on the spool 1. The spool driving gear 18 is supported by a spool bearing 20, which is integrally mounted on the unit base plate 10 for example by caulking, pressing or with screws. The spool bearing 20 is provided, under the unit base plate 10, with a protruding portion 20a as a positioning member for an elastic ring member 21, which is provided on the external periphery of said protruding portion 20a of the spool bearing 20, and said spool bearing 20 is fitted into the camera body 11 with said elastic ring member 21 positioned therebetween.

In the following there will be explained the function of the camera of the above-explained configuration.

The driving force of the motor 9 is transmitted through the slip mechanism 15 to the motor pinion gear 16, and further transmitted, with a speed reduction in the gear train 17, to the spool driving gear 18, thereby rotating the spool 1. Thus the film is taken up on the rotating spool 1 whereby film advancement is achieved.

The present embodiment is featured by the presence of the elastic ring member 21 between the spool bearing 20 and the camera body 11, whereby there can be suppressed the noises and vibrations from the driving source, or the motor 9 in the present embodiment and from the gear train 17 of the unit base plate 10. Also the positional aberration of the spool 1 relative to the camera body 11 can be prevented, as the elastic ring member 21 is provided around the protruding portion 20a of the spool bearing. Furthermore, the elastic ring member 21 also functions as a dust preventing member, with improved sealing ability in comparison with the dust preventing member 30 explained before.

[Second Embodiment]

Figure 3:
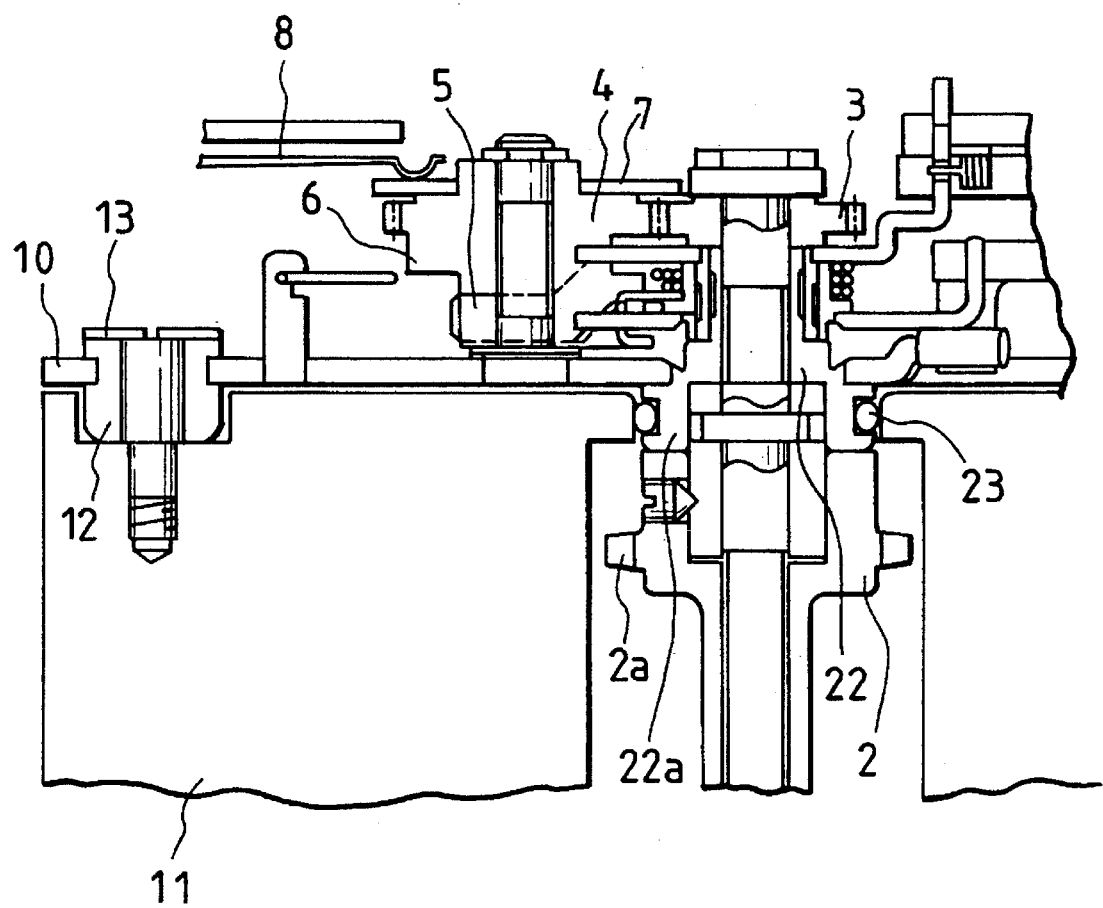
FIG. 3 is a cross-sectional view of a second embodiment of the camera of the present invention.

FIG. 3 is a cross-sectional view of a second embodiment of the present invention, which is different from the first embodiment in that a positioning member bearing an elastic ring member is provided on the sprocket bearing.

The structure of this embodiment consists of a driving mechanism composed of a sprocket 2, sprocket teeth 2a, a sprocket gear 3, a sprocket conversion gear 4, a sprocket limiting cam 5, a reverse rotation stopping cam 6, a phase detecting plate 7 etc., and a mechanism for fixing a unit base plate 10 to a camera body 11, composed of a sprocket bearing 22, a protruding portion 22a thereof and an elastic ring member 23.

The sprocket 2 is supported by a sprocket bearing 22, integrally fixed to the unit base plate for example by caulking of fixing with screws. Said sprocket bearing 22 is provided, under the unit base plate 10, with the protruding portion 22a serving as a positioning member, being provided therearound with the elastic ring member 23 and fitted into the camera body 11 by means of said elastic ring member 23.

The camera of the above-explained configuration functions in the following manner.

Figure 1:
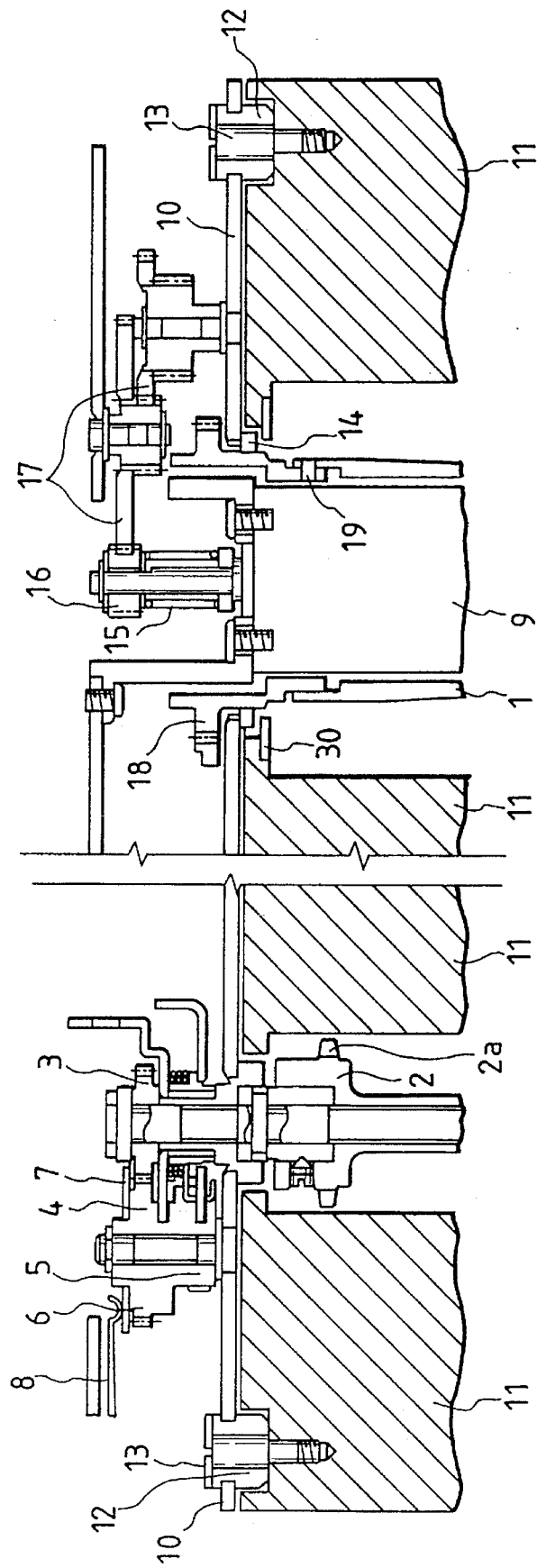
FIG. 1 is a cross-sectional view showing a conventional example of fixation of the unit base plate.

The sprocket 2 rotates by the engagement of the sprocket teeth with the perforations of the film. The rotation of the sprocket 2 is transmitted, through the sprocket gear 3 to the sprocket conversion gear 4, and further to the sprocket limiting cam 5, the reverse rotation stopping cam 6 and the phase detecting plate 7 rotating integrally with the sprocket conversion gear 4. The gear ratio of the sprocket gear 3 and the sprocket conversion gear 4 is so selected that said sprocket conversion gear 4 makes a full turn when the film is advanced by a frame. The phase detection plate 7 is provided with a phase detection switch 8, of which signal stops the motor 9 shown in FIG. 1 after the film is advanced by a frame.

The present embodiment is featured by the presence of the elastic ring member 23 between the sprocket bearing 22 and the camera body 11, whereby the noises and vibration from the driving source, which is the sprocket in the present embodiment, can be suppressed. Also the presence of the elastic ring member 23 around the protruding portion 22a of the sprocket bearing allows to prevent positional aberration of the sprocket 2 relative to the camera body 11.

In the following there will be explained a third embodiment. As in the first embodiment shown in FIG. 2, the spool bearing 20 is provided, under the unit base plate 10, with the protruding portion 20a serving as the positioning member and being provided therearound with the elastic ring member 21, whereby said protruding portion 20a is fitted into the camera body 11 across said elastic ring member 21, and, as in the second embodiment shown in FIG. 3, the sprocket bearing 22 is provided, under the unit base plate 10, with the protruding portion 22a which is provided therearound with an elastic ring member 23 and is fitted into the camera body 11 across said elastic ring member 23.

Figure 4A:
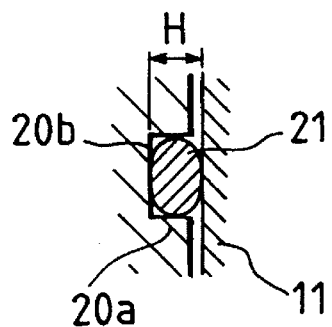
FIG. 4A is a cross-sectional view of an elastic ring member 21 mounted on a projecting portion 20a of the spool bearing.
Figure 4B:
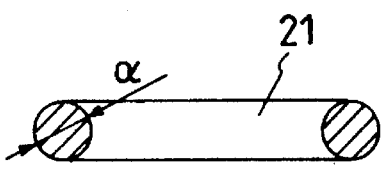
FIG. 4B is a cross-sectional view of said elastic ring member 21 prior to mounting.

However, in case of fitting, utilizing the elastic ring members 21, 23 at two positions, it is necessary to avoid excessive positional constraint on the unit base plate 10 relative to the camera body 11 in order to improve the positional precision and to facilitate the fitting operation of the unit base plate 10 to the camera body 11. For this purpose the elastic ring members 21, 23 may be given different compressibilities, according to the priority on the positional precision. FIG. 4A is a cross-sectional view of the elastic ring member 21 mounted on the protruding portion 20a of the spool bearing, and FIG. 4B is a cross-sectional view of said elastic ring member prior to mounting. In the present application, the compressibility $\delta$ is defined by:

$$\delta=(d-H)d$$

wherein d: diameter of the circle-sectioned body constituting the elastic ring member (O-ring) 21; and H: dimension of the sealing groove, or the distance between the bottom of the sealing groove 20b provided on the protruding portion 20a and the camera body 11.

In the present embodiment, as the priority is given to the precison of the film stopping position, the elastic ring member 23 provided on the protruding portion 22a of the spool bearing is given a higher compressibility than that of the elastic ring member 21 provided on the protruding portion 20a of the spool bearing. Thus, also in case of use of plural elastic ring members, by varying the compressibility according to the requirement for the positional precision, it is rendered possible to prevent excessive constraint, thereby providing a camera with a high positional precision and with satisfactory assembling ability without adjustments. More specifically it is made possible to achieve the positioning by means of the elastic ring member 23 provided on the protruding portion 22a of the sprocket bearing, and to avoid the rotational movement of the unit base plate, generated about the sprocket 2 by the film winding force of the motor 9, relative to the camera body 11, by means of the elastic ring member 21 provided on the protruding portion 20a of the spool bearing.

Figure 5A:
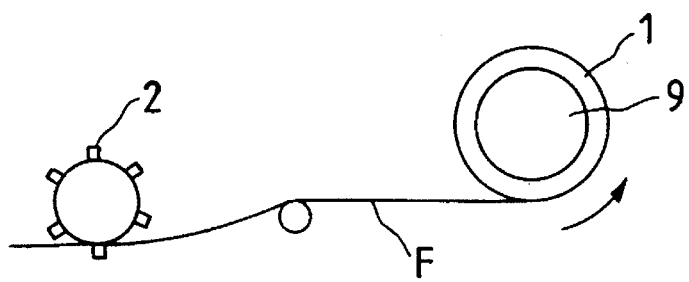
FIG. 5A is a view showing the state of winding of a film F on a spool 1.
Figure 5B:
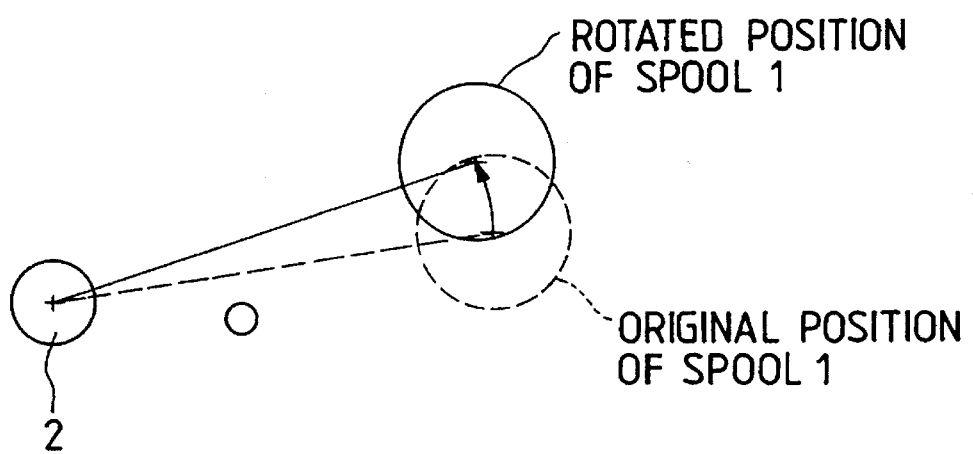
FIG. 5B is a view showing the rotation about the sprocket 2 when the winding of the film F is terminated.

FIG. 5A illustrates the film winding state on the spool 1, and FIG. 5B illustrates the rotational movement about the sprocket when the film winding is terminated. As shown in FIG. 5A, the spool 1 is rotated by the motor 9 in the direction of arrow, thereby taking up the film F. When the sprocket 2 is stopped by a mechanical limit, the spool 1 continues rotation for a while as a continuation of the film winding operation, whereby a rotational movement is generated about the sprocket, as shown in FIG. 5B. Such rotational movement can however be avoided by the elastic ring member 21.

The sprocket 2 is supported by the sprocket bearing 22, mounted integrally on the unit base plate 10 for example by caulking or by fixation with screws. The sprocket bearing 22 is provided, under the unit base plate 10, with a protruding portion 22a, which is provided therearound with an elastic ring member 23 and is adapted to be fitted into the camera body 11 across said elastic ring member 23. It is also possible to replace said protruding portion 22a of the sprocket bearing with another positioning member provided on the unit base plate 10, said positioning member being provided therearound with an elastic ring member and being adapted to be fitted into the camera body.

In the present embodiment the elastic ring members 21, 23 and the elastic member 12 are constructed separately, but there may naturally be employed a structure in which elastic ring members are provided and fixed for example with screws in positions where positional precision is required between the unit base plate 10 and the camera body 11, so that a same member can be utilized for positioning and fixation.

The foregoing embodiments employ ring-shaped elastic members, but there may be employed elastic members of any shape, as long as they can suppress the vibrations and noise and can prevent positional aberration of the spool and the sprocket.

As explained in the foregoing, the present invention, owing to the presence of an elastic portion between the camera body and the bearing portion rotatably supporting a rotary shaft relating to the film feeding, allows to reduce the vibration and noise generated by said rotary shaft and to prevent the positional aberration of said rotary shaft relative to the camera body.

What is claimed is:

1. A camera comprising:

a camera body;

a supporting base plate connected to said camera body across a connecting member;

a rotary shaft of which an end extends through said supporting base plate into said camera body;

a bearing member for rotatably supporting said rotary shaft on said supporting base plate; and an elastic member provided between said bearing member and said camera body;

wherein said camera body supports said bearing member across said elastic member.

2. A camera comprising:

a camera body unit;

an integral unit of a driving mechanism including at least a rotary shaft and a bearing portion provided between said rotary shaft and said camera body unit, for rotatably supporting said rotary shaft;

a connecting portion for integrally connecting said camera body unit and said integral unit; and an elastic portion provided between said camera body unit and said bearing portion;

wherein said bearing portion is supported by said camera body unit across said elastic portion.

3. A camera according to claim 2, wherein said rotary shaft is a spool shaft for winding a film.

4. A camera according to claim 2, wherein said rotary shaft is a sprocket shaft rotated in linkage with the advancement of a film.

5. A camera comprising:

a camera body unit;

an integral unit of a driving mechanism including a spool shaft related to film winding, a sprocket shaft rotated in linkage with film advancement, a first bearing portion provided between said spool shaft and said camera body unit for rotatably supporting said spool shaft, and a second bearing portion provided between said sprocket shaft and said camera body unit for rotatably supporting said sprocket shaft;

a connecting portion for integrally connecting said camera body unit and said integral unit;

a first elastic portion provided between said camera body unit and said first bearing portion; and a second elastic portion provided between said camera body unit and said second bearing portion and having a compressibility higher than that of said first elastic portion;

wherein said camera body unit supports said first and second bearing portions, respectively across said first and second elastic portions.

* * * * *